(12) United States Patent
Chennamsetty et al.

(10) Patent No.: US 10,963,580 B2
(45) Date of Patent: *Mar. 30, 2021

(54) SYSTEMS AND METHODS FOR RULE BASED DYNAMIC SELECTION OF RENDERING BROWSERS

(71) Applicant: INTERNATIONAL BUSINESS MACHINES CORPORATION, Armonk, NY (US)

(72) Inventors: Ramamohan Chennamsetty, Hopewell Junction, NY (US); Charles K. Davis, III, Denver, CO (US); Christopher R. Dotson, Lexington, KY (US); Charles S. Lingafelt, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/534,951

(22) Filed: Aug. 7, 2019

(65) Prior Publication Data

US 2019/0362084 A1 Nov. 28, 2019

Related U.S. Application Data

(63) Continuation of application No. 15/573,020, filed on Sep. 22, 2016, now Pat. No. 10,430,595.

(51) Int. Cl.
*H04L 9/00* (2006.01)
*G06F 21/62* (2013.01)
*G06F 21/51* (2013.01)

(52) U.S. Cl.
CPC .............. *G06F 21/62* (2013.01); *G06F 21/51* (2013.01)

(58) Field of Classification Search
CPC ....................................................... G06F 21/62
(Continued)

(56) References Cited

U.S. PATENT DOCUMENTS

| 7,225,225 B2 | 5/2007 | Kuki et al. |
| 9,009,218 B2 | 4/2015 | Chen et al. |

(Continued)

FOREIGN PATENT DOCUMENTS

EP          1895744 A1     3/2008

OTHER PUBLICATIONS

Chen et al., "App Isolation: Get the Security of Multiple Browsers with Just One," ACM, 2011 (11 pages).

(Continued)

*Primary Examiner* — Christopher J Brown
(74) *Attorney, Agent, or Firm* — Griffiths & Seaton PLLC

(57) ABSTRACT

Embodiments for rendering content by a processor are provided. A request to render content is received. A score is assigned to each of a plurality of rendering browsers based on a plurality of factors associated with the content and the plurality of rendering browsers, the score used in determining a selection of the rendering browser and weighted according to each of the plurality of factors which include: a security risk of the content, and language support, performance characteristics and a user preference of the plurality of rendering browsers. The selected rendering browser is automatically instantiated and the content is rendered by the selected rendering browser on the computing device.

15 Claims, 9 Drawing Sheets

(58) Field of Classification Search
USPC .......................................................... 726/1
See application file for complete search history.

(56) References Cited

U.S. PATENT DOCUMENTS

| | | |
|---|---|---|
| 9,055,048 B2 * | 6/2015 | Shepherd ................ G06F 21/62 |
| 2004/0012627 A1 | 1/2004 | Zakharia et al. |
| 2011/0087962 A1 * | 4/2011 | Paddon ................ G06F 3/0237 |
| | | 715/265 |
| 2013/0097298 A1 | 4/2013 | Ting et al. |
| 2016/0034118 A1 * | 2/2016 | Crosley ................ G06F 3/0482 |
| | | 715/739 |

OTHER PUBLICATIONS

List of IBM Patents or Patent Applications Treated as Related Jul. 28, 2020 (2 Pages).

* cited by examiner

600

| ATTRIBUTE | DETECT VALUE | RENDERING ENGINE WEIGHTING | | |
|---|---|---|---|---|
| | | RE 1 | RE 2 | RE 3 |
| OS | OS 1 | 80 | 30 | 40 |
| OS PATCH LEVEL | CURRENT - 1 | 50 | 100 | 50 |
| BROWSER PATCH LEVEL | RE 1 = CURRENT -2<br>RE 2 = CURRENT<br>RE 3 = CURRENT -1 | -25 | 100 | 50 |
| OWNERSHIP | ENTERPRISE | 75 | 75 | 75 |
| USER ROLE | EXECUTIVE | -50 | 0 | 100 |

| ATTRIBUTE | DETECT VALUE | RENDERING ENGINE WEIGHTING | | |
|---|---|---|---|---|
| | | RE 1 | RE 2 | RE 3 |
| WEB SERVER DOMAIN | WITHIN ENTERPRISE | 300 | -200 | -200 |
| DEVICE SECURITY POSTURE | POOR | 0 | 0 | 100 |

| ATTRIBUTE | DETECT VALUE | RENDERING ENGINE WEIGHTING | | |
|---|---|---|---|---|
| | | RE 1 | RE 2 | RE 3 |
| THREAT ACTIVE | YES - FOR RE 2 | 0 | -300 | 0 |
| EXPLOIT PUBLISH | YES - FOR RE 1 | -1000 | 500 | 500 |

| ATTRIBUTE | DETECT VALUE | RENDERING ENGINE WEIGHTING | | |
|---|---|---|---|---|
| | | RE 1 | RE 2 | RE 3 |
| WEB SERVER DOMAIN | WITHIN ENTERPRISE | 300 | -200 | -200 |
| CODE X ON WEB PAGE | YES | -25 | 0 | 100 |
| SOFTWARE Y ON WEB PAGE | NO | -na- | -na- | -na- |
| WEB PAGE LINKS TO KNOWN MALICIOUS PAGE | YES | -200 | -100 | 100 |

|  | RE1 | RE2 | ... | RE"n" |
|---|---|---|---|---|
| RULE 1 | 10 | 30 |  | 50 |
| RULE 2 | 0 | 0 |  | 30 |
| ... |  |  |  |  |
| RULE "n" | 40 | -20 |  | 0 |
| TOTAL: | 350 | 125 |  | 910 |

FIG. 10

SYSTEMS AND METHODS FOR RULE BASED DYNAMIC SELECTION OF RENDERING BROWSERS

CROSS REFERENCE TO RELATED APPLICATIONS

This application is a Continuation of U.S. patent application Ser. No. 15/273,020, filed on Sep. 22, 2016.

BACKGROUND OF THE INVENTION

Field of the Invention

The present invention relates in general to computing systems, and more particularly to, various embodiments for rendering content by a processor on a computing device.

Description of the Related Art

Modern computing devices (e.g., desktop computers, laptop computers, tablets, cellular telephones, etc.) are often equipped with multiple applications that may be used to open, render, and/or display content. For example, it is not uncommon for desktop computers and laptop computers to have multiple web browsers installed, all of which are generally capable of allowing the user to navigate to most, if not all, websites on the Internet.

However, due to various factors, such as security concerns and performance related issues, particular applications (e.g., browsers) may be better suited for rendering particular content (e.g., navigation to a particular website). Additionally, some organizations (e.g., businesses) may have internal guidelines related to which applications are preferably used for rendering particular types of content. In many cases, it is very difficult, if not virtually impossible, for individuals to know which applications are most suitable and/or preferred for rendering the content they wish to open or view.

SUMMARY OF THE INVENTION

Various embodiments for rendering content by a processor are provided. In one embodiment, by way of example only, a method comprises receiving a request to render content; assigning a score to each of a plurality of rendering browsers based on a plurality of factors associated with the content and the plurality of rendering browsers; wherein the score is used in determining a selection of the rendering browser and is weighted according to each of the plurality of factors comprising at least: a security risk of the content, and language support, performance characteristics and a user preference of the plurality of rendering browsers; and automatically instantiating the selected rendering browser and causing the content to be rendered by the selected rendering browser on the computing device

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 6-10 are tables showing various weight values and/or scoring of browsers according to various aspects of the present invention.

DETAILED DESCRIPTION OF THE DRAWINGS

Figure 1:
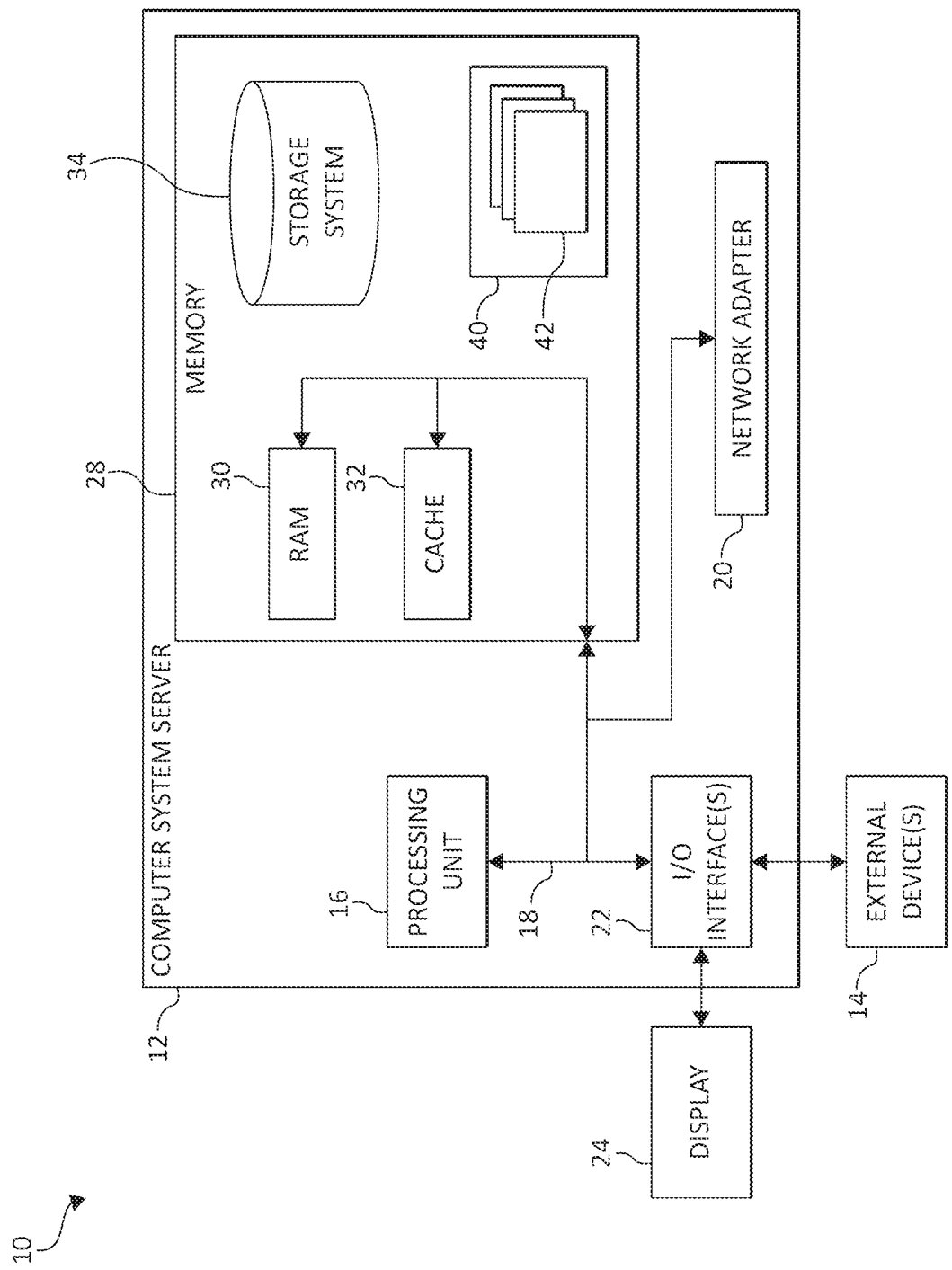
FIG. 1 is a block diagram depicting an exemplary cloud computing node according to an embodiment of the present invention.

As discussed above, modern computing devices (e.g., desktop computers, laptop computers, tablets, cellular telephones, etc.) are often equipped with multiple applications that may be used to open, render, and/or display content. The problem of determining which application is most suitable for rendering particular types of content may manifest itself in different ways to different entities.

For example, with respect to navigating the Internet, from an end user perspective, users may have to select which browser (i.e., web browser) to use to view or parse content due to, for example, the content they wish to display, the languages the browsers can support, and/or the performance of particular browsers for the particular types of content.

From a solution (or software) provider perspective, the provider may be required to, for example, support multiple browsers, or multiple versions of the same browser, due to end user preference and/or compatibility issues with respect to older browser technology.

While from a security perspective, there may be several issues, such as the fact that not all browsers are secure and there is no one browser that can do everything an administrator (e.g., an enterprise software security team) desires. Many browsers do not account for the transactional context to be able to behave differently and secure the content differently, and/or often the external environment (i.e., the threat landscape) is not taken into consideration.

Consider an example in which a particular end user, such as a corporate employee, generally prefers to use a particular browser. However, the user is unaware of the threat landscape, vulnerabilities in his/her system, or corporate policy. It is likely not practical for the user to assess these variables in order to select the most appropriate browser to render the particular content (or information) he/she desires. Rather, in all likelihood, the user will simply navigate to (or open), for example, a particular website, which will result in perhaps hundreds of objects being automatically downloaded to the computing device he/she is using as the website is opened. It is often not possible, let alone realistic, for he/she to understand the threats from the hundreds of objects, or even to have visibility into the stream of data being pushed into the browser.

Ideally, the "correct" (or "best") browser would be automatically launched and perform the intended action, where the selected browser would be seamlessly selected based on, for example, security risk posture, the transactional context, language support, performance characteristics, and/or user preference. In some embodiments described herein, some, if not all, of these attributes are assessed, ranked and evaluated in order to select, and perhaps automatically instantiate, the most appropriate browser.

In some embodiments, when a request to render content is received, various attributes and/or information associated with, for example, the content, the available browsers (e.g., those installed on the computing device), the computing device in use, the network(s) involved, etc., is used to select one of the available browsers. The selected browser may be chosen based on the attributes/information and a set of predetermined rules. In one example, after one of the browsers is selected, that browser is automatically instantiated to render the requested content. However, in another example, the user is simply provided with an indication of the selected browser.

In some embodiments, the selection of the browser (and/or the scoring of the browsers) is based on security information (e.g., operating system (OS) type, OS patch level, browser type, browser patch level, etc.) associated with the computing device being used by the user. However, the selection of the browser may (also) be based on performance characteristics associated with the content and the computing device (e.g., the type of objects or code in the content and the ability of the computing device and/or the browsers to render such objects/code). In some embodiments, the selection may (also) be based on information associated with the owner of the computing device (e.g., a personal computing device vs. a business/corporation owned computing device). The selection of the browser may include (and/or be based on) a "scoring" of the available browsers which is performed using the attributes/information and the predetermined rules.

In at least some embodiments, the content is (at least originally) stored on a (second) computing device (e.g., a server) that is remote (e.g., at a different location, on a different network, etc.) from the computing device being used by the user (e.g., by navigation of the Internet). However, although many of the examples described herein may be related to rendering content available on the Internet (e.g., navigation to websites) using web browsers, it should be understood that the terms "browser," "rendering browser," "rendering engine," and the like may refer to any application that may be used to open, render, and/or display content other than what is available on the Internet. For example, the systems and methods described herein may be applicable to applications in which the content to be rendered is stored locally (e.g., on the same computing device and/or on the same network as the computing device), such as text documents, spreadsheets, and images, including, for example, those that were previously downloaded from the Internet or an email.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
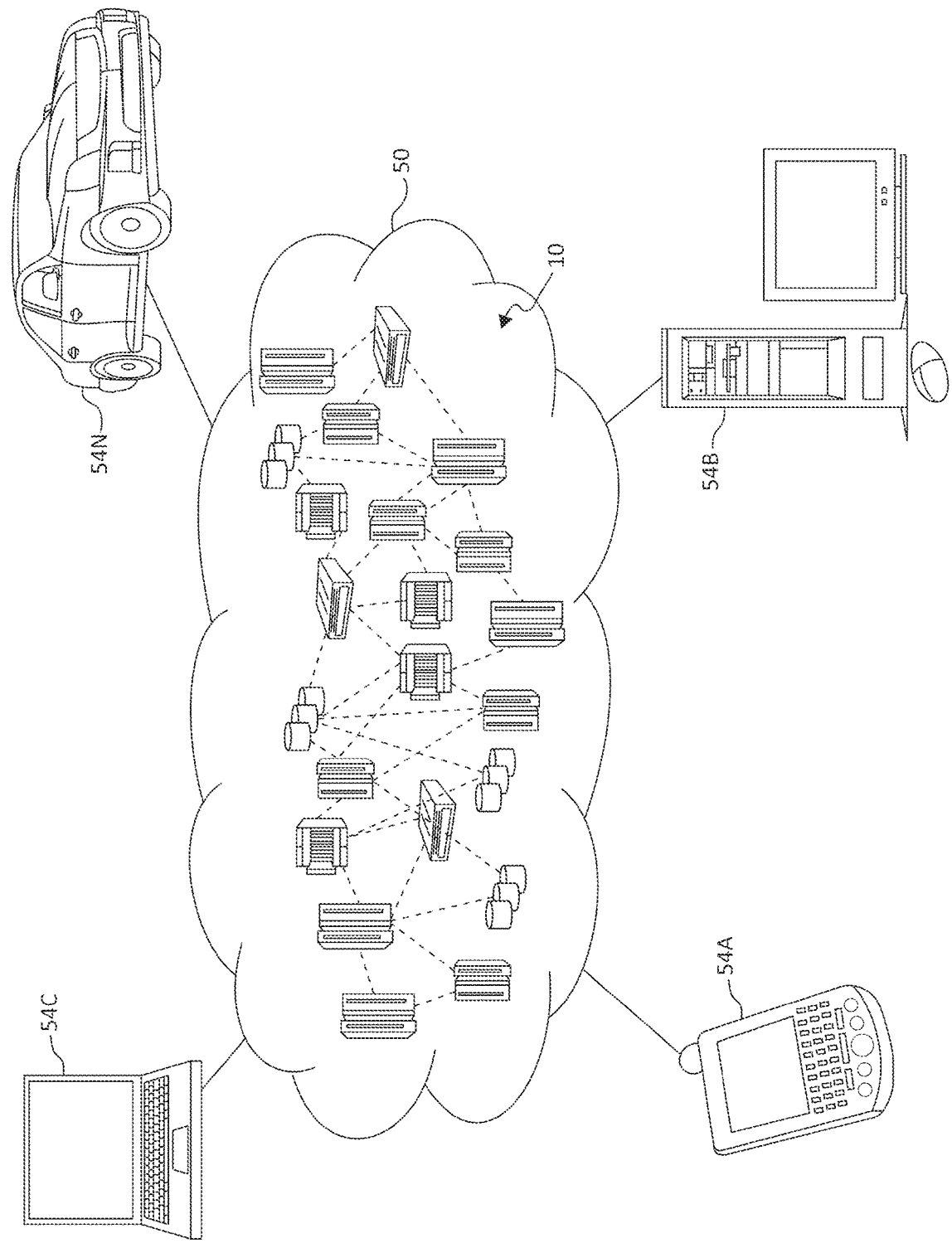
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
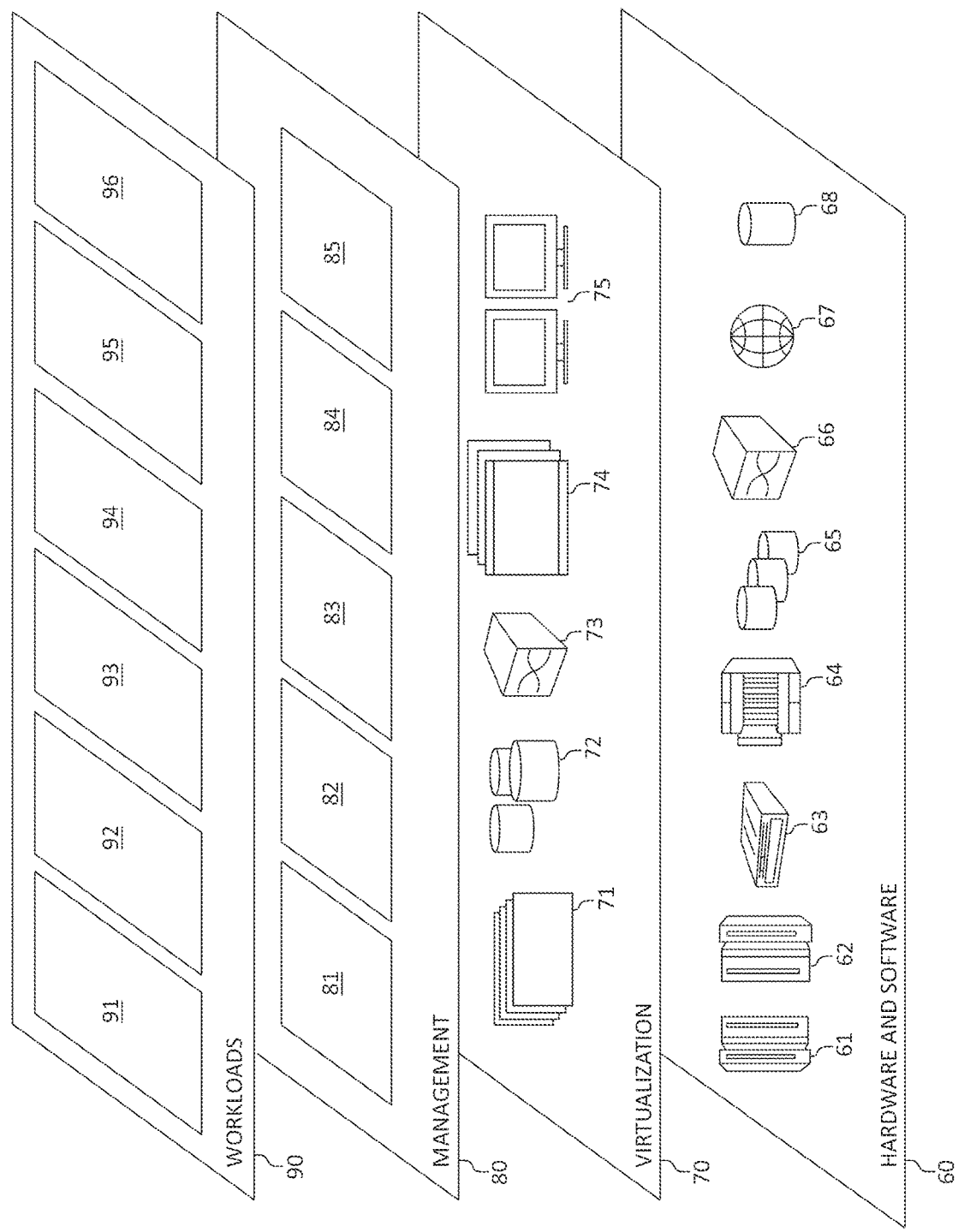
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various communication processing workloads and functions 96. In addition, communication processing workloads and functions 96 may include such operations as data analytics, data analysis, and as will be further described, browser scoring and/or selection. One of ordinary skill in the art will appreciate that the communication processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for rendering content on a computing device in such a way that the content is rendered, perhaps automatically and/or seamlessly, by an appropriate browser when considering, for example, security threats, user preference, device performance, corporate policies, etc.

Figure 4:
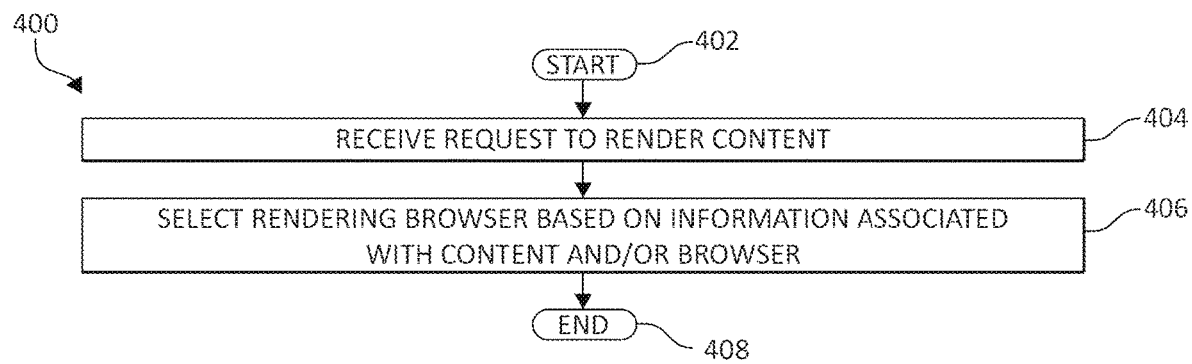
FIG. 4 is a flowchart diagram depicting an exemplary method for rendering content, in which various aspects of the present invention may be realized.

Turning now to FIG. 4, a flowchart of an exemplary method 400 for rendering content by a processor is depicted, in which various aspects of the present invention may be implemented. In the depicted embodiment, method 400 begins (step 402) with a request to render content (e.g., a website) being received (step 404). Although not shown in FIG. 4, it should be understood that additional steps or processes may be performed prior to the receiving of the request, as described below.

A rendering browser is then selected (e.g., from multiple browsers) based on information associated with the content and/or available browsers (step 406). In some embodiments, the information upon which the browser selection is made is related to security considerations associated with the content and/or the browsers. However, it should be understood that other information may be used, such as user preference, performance considerations, corporate policies, etc., perhaps in combination with the security considerations.

Method 400 ends (step 408) with, for example, the selected browser being instantiated to render the content, or perhaps the user simply being provided with an indication of which browser was selected.

Figure 5:
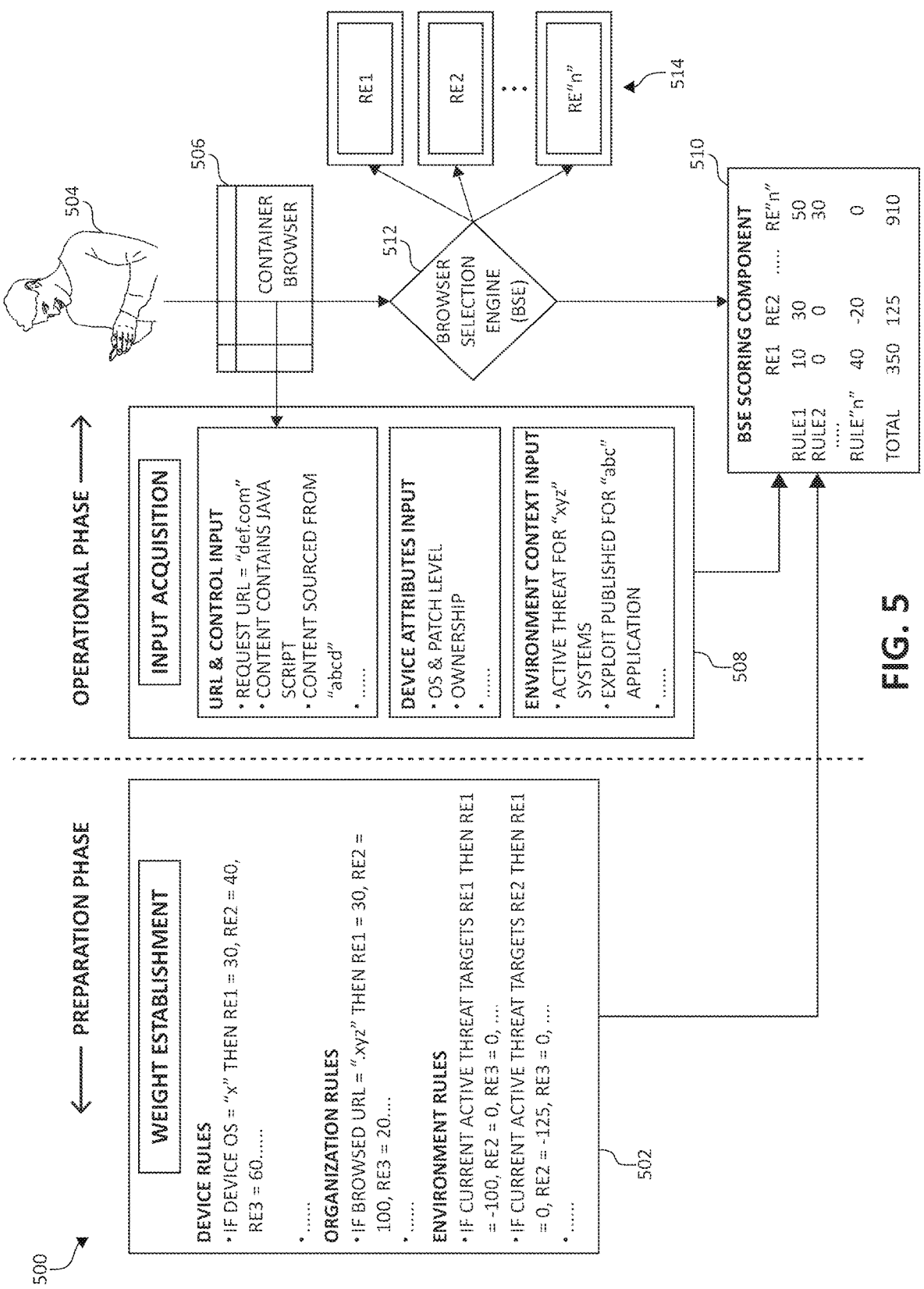
FIG. 5 is a block/flow diagram illustrating certain aspects of functionality according to the present invention.

In view of the method 400 of FIG. 4, consider, as an illustration of exemplary functional blocks to accomplish various aspects of the embodiments described herein, FIG. 5, following. FIG. 5 illustrates these exemplary functional blocks 500 and associated notes on specific functionality. Each of the functional blocks 500 may be implemented in hardware and/or software, such as by the computer/server 12 (FIG. 1), and/or the workloads layer 90 (FIG. 3).

In the depicted embodiment, during a preparation phase (e.g., before a request to render content is received) a rendering engine (or browser) weights and rules for each pertinent circumstance are established at weight establishment block 502. In other words, at (or in) block 502, the rules which are used to select the rendering browser are established or generated (and/or the rules are stored therein).

In some embodiments, for each pertinent attribute/circumstance, rendering engine weights for each rendering engine are established. The weights may be based on risk, user experience, and other criteria. In some embodiments, the higher the weight, the more favorable/desirable it is to use that particular rendering browser. However, it should be understood that the weights could be arranged so that the lower the weight, the more favorable/desirable it is to use that particular rendering browser. In some exemplary embodiments, there are three rule sets of weights (or rules): devices rules, organizational rules, and environmental rules.

Device rules may assign a weight to each available rendering browser or engine (RE) for each pertinent attribute related to the device (i.e., the computing device) in use. Device rules may be related to, for example, the type of operating system (OS) in use on the computing device, the version/patch level of the operating system, and/or the ownership of the computing device (e.g., owned by a company, individual employee, etc.). The selection of pertinent device attributes may be made by the solution administrator or may be a default setting in the systems described herein. Exemplary device rules are shown below:

If device OS="OS 1," then RE 1=30, RE 2=40, RE 3=80.

If device ownership="company," then RE 1=10, RE 2=300, RE 3=10.

If device OS patch level="current," then RE 1=10, RE 2=10, RE 3=10.

If device OS Patch level="current−1," then RE 1=50, RE 2=100, RE 3=50.

If device OS Patch level="current−2," then RE 1=10, RE 2=100, RE 3=10.

In other words, with respect to the first rule listed above, if a particular operating system (i.e., OS 1) is being used by the computing device on which the content is to be rendered, rendering engine 1 (RE 1) is given a score (or weight value) of 30, rendering engine 2 (RE 2) is given a score of 40, and rendering engine 3 (RE 3) is given a score of 80. With respect to the second rule listed above, if the computing device is owned by a company (e.g., the employer of the user), RE 1 is given a score of 10, RE 2 is given a score of 300, and RE 3 is given a score of 10. With respect to the third rule listed above, if the operating system has the most recent patch installed (i.e., is "current"), all three rendering engines are given a score of 10. With respect to the fourth and fifth rules, if the operating system does not have the most recent patch (i.e., either "current−1" or "current−2"), the scores shown above are provided.

It should be noted that the numbers or values associated with the scores (or weight values) may be arbitrary and are simply provided to indicate the relative strengths (and/or weaknesses) of the rendering engines when compared to each other (and/or the preference of using one over the others) based on the rules.

Organizational rules may assign a weight to each available rendering browser for each pertinent organizational policy (e.g., company/corporate rules) associated with the computing device in use. The selection of pertinent organizational attributes may be made by the solution administrator or may be a default setting in the systems described herein. Exemplary organizational rules are shown below:

If URL domain=".my_company," then RE 1=10, RE 2=10, RE 3=10.

If URL domain≠".my_company," then RE 1=5, RE 2=300, RE 3=10.

If security posture of endpoint="poor," then RE 1=5, RE 2=300, RE 3=10.

If security posture of endpoint="good," then RE 1=10, RE 2=100, RE 3=10.

If security posture of endpoint="excellent," then RE 1=10, RE 2=10, RE 3=10.

In other words, with respect to the first rule listed above, if the content is a website with a particular URL domain (e.g., the website of the company that owns the computer), all three rendering engines are given a score of 10. However, with respect to the second rule, for a different website (e.g., not the website of the company that owns the computer), RE 1 is given a score of 5, RE 2 is given a score of 300, and RE 3 is given a score of 10. The other rules listed above, as well as those described below, may be interpreted in a similar manner.

Environmental rules may assign a weight to each available rendering browser for each pertinent environmental attribute (e.g., network threat level) associated with the computing device in use. The selection of pertinent environmental attributes may be made by the solution administrator or may be a default setting in the systems described herein. Exemplary environmental rules are shown below:

If current active threat="RE 1 remote code execution," then RE 1=10, RE 2=100, RE 3=100.

If device is connected to a "trusted" network, then RE 1=10, RE 2=10, RE 3=10.

If device is connected to an "untrusted" network, then RE 1=100, RE 2=500, RE 3=10.

It should be noted that the weighting may change for the same condition, based on other factors. For example, if the patch level is "current−1" for the OS or browser (i.e., indicating that the OS or browser is not the latest version), but there are no security concerns with "current−1" for that particular OS or browser, then the weighting may be higher. However, if there was a security concern, the weighting would be lower.

Thus, for the same condition, the weighting may change based on other factors. For example, if there was little or no change in security posture from a previous version (or patch) of a browser (e.g., "current−1") to the current version of the browser (e.g., "current"), the weighting may be the same for both "current" and "current−1." However, if there was a significant change or improvement in security posture from the previous version of the browser to the current version of the browser, the weighting may be significantly different for "current" and "current−1." This feature may be particularly beneficial with respect to minimizing security threats while still optimizing performance and/or user experience.

It should also be noted that by selecting the weightings with respect to each other, the weightings of each attribute may themselves be weighted (e.g., two levels of weighting). For example, if the risk when streaming content containing a particular type of object, code, or software (e.g., "Code X" or "Software Y") is much greater than the risk if the OS patch level is not current, the weights for the object/code attributes may be set lower than the weights for the OS patch level. If the risk is particularly bad, certain attributes may be "safety" weighted to minimize the chance that a particular browser is selected. As an example, the presence of the particular object/code in the streaming content may by weighted at −500, while the previous OS patch level may be weighted at 50.

As such, embodiments described herein allow for the relative importance of each evaluated attribute to set and/or be adjusted.

Still referring to FIG. 5, in the depicted embodiment, during an operational phase, browsers are assigned weight values (or scores) based on real time input combined with the rules established in the preparation phase. For example, when a request to render content is received from user 504 through, for example, container browser 506, the request is parsed and initial content is received from the source of the content (e.g., the webpage server). Each element in the content stream may be assessed for attributes of interest (e.g., as described above) by, for example, input acquisition block 508.

In the depicted embodiment, the attributes of interest along with the rules established in weight establishment block 502 are sent to browser selection engine scoring component 510. Browser selection engine scoring component 510 generates scores for each of the available browsers based on, for example, the rules, weights, etc. described above, along with the pertinent information associated with the requested content.

For example, with respect to the device rules, for each device attribute established as being material in the preparation phase, a weight value (or score) is assigned to each browser engine based on the weighting rules. As a specific example, the device attributes established in the preparation phase may be OS type/kind, OS version/patch level, browser patch level, ownership, and user type. A browser weighting may be assigned for each attribute.

Examples are as follows: With respect to OS type, when the OS is "051," RE 1 is safer than RE 3, and RE 3 is safer than RE 2. With respect to OS version, when the OS version is "current−1," RE 2 is safer than either RE 1 or RE 3, and RE 1 and RE 3 are equally safe. With respect to browser patch level, each browser may be assigned a weighting (or score) based on how current the patch level is, as described above. With respect to ownership, when the owner is an enterprise business, there is no difference in the browsers with respect to safety. With respect to user type, when the user is an executive, RE 3 is safer than RE 2, and RE 2 is safer than RE 1.

FIG. 6 illustrates a table 600 of exemplary browser weights (or scores) that may be generated based on the device attributes described above.

With respect to the organizational rules, for each organizational attribute established as being material in the preparation phase, a weight value is assigned to each browser engine based on the weighting rules. As a specific example, the organizational attributes established in the preparation phase may be the web server domain and the security posture of the computing device.

Examples are as follows: With respect to web server domain, when the domain is internal (i.e., within enterprise) RE 1 is weighted higher than RE 2 and RE 3 and is restricted to specific internal application servers running legacy applications. With respect to device security, when the device security is poor, RE 3 is safer (or "better") than both RE 1 and RE 2.

FIG. 7 illustrates a table 700 of exemplary browser weights that may be generated based on the organizational attributes described above.

With respect to the environmental rules, for each environmental attribute established as being material in the preparation phase, a weight value is assigned to each browser engine based on the weighting rules. As a specific example, the environmental attributes established in the preparation phase may be whether or not an "active" threat has been identified for the browsers and whether or not an exploit for the browsers has been published.

Examples are as follows: With respect to active threats, one or more of the browsers may be known to be currently targeted by an active threat. With respect to exploits, an exploit may have been recently published for the browsers.

FIG. 8 illustrates a table 800 of exemplary browser weights that may be generated based on the environmental attributes described above.

The browser weights (or scores) generated based on different sets of rules (e.g., device, organizational, etc.) may be combined to provide an overall representation of which browser is "best" (or "correct" or "preferred").

An example of such a scoring may be as follows: The web server domain is internal (i.e., within enterprise), so RE 1 is weighted higher than RE 2 and RE 3 and is restricted to specific internal application servers running legacy applications. The content contains a particular type of object or code, so RE 3 is safer than RE 2 which is safer than RE 1. The content links to a known malicious website, so RE 3 is safer than RE 2 which is safer than RE 1.

FIG. 9 illustrates a table 900 of exemplary browser scores that may be generated based on the rules and attributes described above. As is shown, given the particular rules and attributes, RE 1 scores higher than RE 2 and RE 3 with respect to some rules and weights, while RE 3 scores the highest with respect to other rules and weights.

Referring again to FIG. 5, a browser selection engine scoring component 510 may compile and/or compute a total score for each of the browsers, such as the generic example shown in table 1000 depicted in FIG. 10.

In some embodiments, browser selection engine (BSE) 512 selects one of the available rendering engines (or browsers) 514 based on the total scores calculated for each of the browsers 514 (e.g., the browser with the highest score). The selected browser may be automatically instantiated to render the requested content. However, in some embodiments, the user is provided with an indication of the selected browser (e.g., via a message on a display device on the computing device of the user), perhaps in combination with an option of whether or not to render the requested content with the browser selected by the browser selection engine 512.

It should be understood that in the event that any changes occur to the computing device, organization, threats, etc., the rules and weightings described above may be changed to appropriately score the available browsers based on the most current state of the environment.

Figure 11:
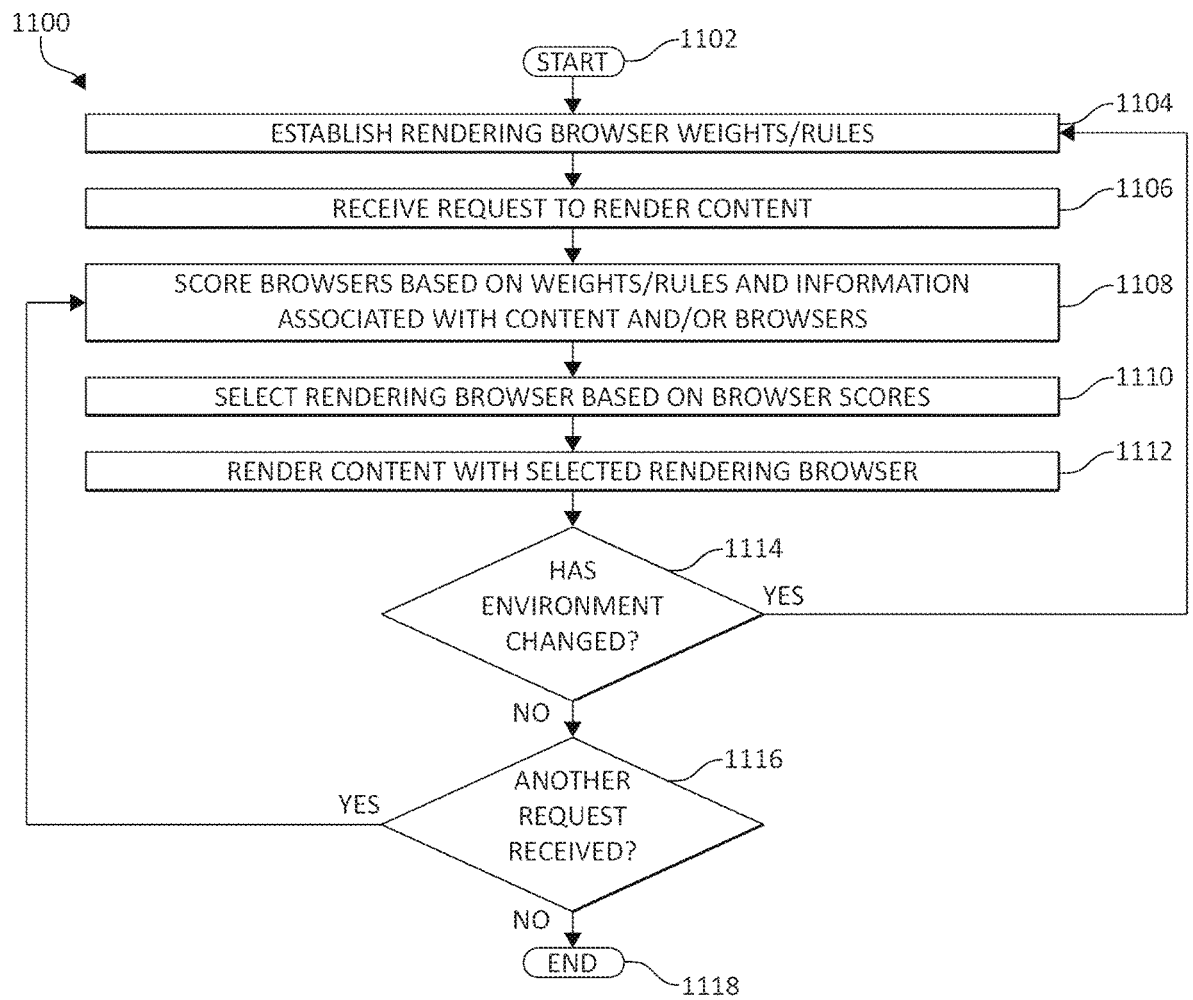
FIG. 11 is an additional flowchart diagram depicting an additional exemplary method for rending content, again in which various aspects of the present invention may be realized.

Turning now to FIG. 11, an additional flowchart showing an additional exemplary method 1100 for rendering content is depicted, here again in which various aspects of the present invention may be realized. As one of ordinary skill in the art will appreciate, the various steps depicted in method 1100 may be completed in an order or version differing from the depicted embodiment to suit a particular scenario.

Method 1100 begins (step 1102) with the establishing of rules and/or weights for the available rendering browsers (step 1104), in a manner described above with respect to, for example, weight establishment block 502 in FIG. 5.

Referring again to FIG. 11, a request to render content is received (step 1106). As described above, the request may be sent through any suitable computing device. In some embodiments, the content is stored on a remote computing device (e.g., a server), but it should be understood that the content may also be stored on the computing device from which the request is sent (e.g., a downloaded file).

The rendering browsers are then scored based on the rules/weights previously established combined with information associated with, for example, the content and/or the available browsers (step 1108). As described above, this information may be related to any attribute of the computing environment in which method 1100 is performed, such as, security attributes (e.g., related to the content, the computing device, the OS, the browser, etc.), organizational policies, user preference, as described above.

A rendering browser is then selected from the available rendering browsers based on the scores (step 1110). In some embodiments, the system is configured such that the rendering browser with the highest score is selected. However, in other embodiments, the selected browser may be the one with the lowest score.

The content is then rendered using the selected rendering browser (step 1112). In some embodiments, the selected browser is automatically instantiated, and the content is opened and displayed (e.g., on a display device of the user's computing device). In some embodiments, rather than automatically instanciating the selected browser, the system may provide the user with an indication (e.g., via a message on the display device of the computing device) of which browser has been selected and perhaps provide the user with an option of whether or not to proceed with the selected browser. In this way, in some embodiments, the selected browser may essentially be simply recommended to the user.

In the depicted embodiment, if any changes have been made to the environment (e.g., newly detected threats, changes in OS, new patches for browsers, changes in organizational policies, etc.), method 1100 again establishes (or reestablishes) the rules and/or weights for the available rendering browsers (step 1114, step 1104). If no such changes have occurred, but another request to render content has been received (step 1116), method 1100 again scores the browsers in the manner(s) described above (step 1108). If another request has not been received (step 1116), method 1100 ends (step 1118).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for rendering content by a processor, comprising:
   receiving a request to render content;
   assigning a score to each of a plurality of rendering browsers based on a plurality of factors associated with the content and the plurality of rendering browsers; wherein the score is used in determining a selection of the rendering browser and is weighted according to each of the plurality of factors comprising at least: a security risk of the content, language support with respect to the content, performance characteristics inclusive of a suitability of hardware characteristics of a computing device executing the plurality of rendering browsers to render objects or code of the content, and a user preference of the plurality of rendering browsers; and
   automatically instantiating the selected rendering browser and causing the content to be rendered by the selected rendering browser on the computing device.

2. The method of claim 1, wherein the selecting of the rendering browser is further based on security information about the computing device.

3. The method of claim 1, wherein the selecting of the rendering browser is further based on the performance characteristics associated with the computing device and information associated with an owner of the computing device.

4. The method of claim 1, wherein the content is stored on a second computing device that is remote from the computing device.

5. The method of claim 1, further including causing an indication of the selected rendering browser to be generated by the computing device.

6. A system for rendering content, comprising:
   a processor that
   receives a request to render content;
   assigns a score to each of a plurality of rendering browsers based on a plurality of factors associated with the content and the plurality of rendering browsers; wherein the score is used in determining a selection of the rendering browser and is weighted according to each of the plurality of factors comprising at least: a security risk of the content, language support with respect to the content, performance characteristics inclusive of a suitability of hardware characteristics of a computing device executing the plurality of rendering browsers to render objects or code of the content, and a user preference of the plurality of rendering browsers; and
   automatically instantiates the selected rendering browser and causing the content to be rendered by the selected rendering browser on the computing device.

7. The system of claim 6, wherein the processor further selects the rendering browser based on security information about the computing device.

8. The system of claim 6, wherein the processor further selects the rendering browser based on the performance characteristics associated with the computing device and information associated with an owner of the computing device.

9. The system of claim 6, wherein the content is stored on a second computing device that is remote from the computing device.

10. The system of claim 6, wherein the processor causes an indication of the selected rendering browser to be generated by the computing device.

11. A computer program product for rendering content by a processor, the computer program product comprising a non-transitory computer-readable storage medium having computer-readable program code portions stored therein, the computer-readable program code portions comprising:
    an executable portion that receives a request to render content;
    an executable portion that assigns a score to each of a plurality of rendering browsers based on a plurality of factors associated with the content and the plurality of rendering browsers; wherein the score is used in determining a selection of the rendering browser and is weighted according to each of the plurality of factors comprising at least: a security risk of the content, language support with respect to the content, performance characteristics inclusive of a suitability of hardware characteristics of a computing device executing the plurality of rendering browsers to render objects or code of the content, and a user preference of the plurality of rendering browsers; and
    an executable portion that automatically instantiates the selected rendering browser and causing the content to be rendered by the selected rendering browser on the computing device.

12. The computer program product of claim 11, wherein the selecting of the rendering browser is further based on security information about the computing device.

13. The computer program product of claim 11, wherein the selecting of the rendering browser is further based on the performance characteristics associated with the computing device and information associated with an owner of the computing device.

14. The computer program product of claim 11, wherein the content is stored on a second computing device that is remote from the computing device.

15. The computing program product of claim 11, further including an executable portion that causes an indication of the selected rendering browser to be generated by the computing device.

* * * * *